United States Patent
Engi et al.

(10) Patent No.: US 12,556,927 B2
(45) Date of Patent: Feb. 17, 2026

(54) SPEECH CONFIDENTIALITY MONITORING AND ALERTING

(71) Applicant: Cisco Technology, Inc., San Jose, CA (US)

(72) Inventors: Derek William Engi, Pleasant Ridge, MI (US); Matthew David Barber, London (GB); Thomas E. Fincher, London (GB); Marianna Pittokopiti, London (GB); Matthew Robert Engle, Plano, TX (US); Joseph Michael Clarke, Cary, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 110 days.

(21) Appl. No.: 18/417,557

(22) Filed: Jan. 19, 2024

(65) Prior Publication Data

US 2025/0240626 A1    Jul. 24, 2025

(51) Int. Cl.
*G06F 21/00* (2013.01)
*G10K 11/175* (2006.01)
(Continued)

(52) U.S. Cl.
CPC ....... *H04W 12/122* (2021.01); *G10K 11/1754* (2020.05); *G10L 25/51* (2013.01); *H04W 12/02* (2013.01); *H04M 1/19* (2013.01)

(58) Field of Classification Search
CPC ............. H04W 12/122; H04W 12/02; G10K 11/1754; G10L 25/51; H04M 1/19
See application file for complete search history.

(56) References Cited

U.S. PATENT DOCUMENTS 9,378,634 B1   6/2016 Kashyap et al.
10,393,866 B1 * 8/2019 Kravets ................ G01S 13/003
(Continued)

FOREIGN PATENT DOCUMENTS

EP    1818909 A1 *   8/2007   ............. G10L 15/20

OTHER PUBLICATIONS

The Engineering ToolBox: "Sound—Room Absorption Coefficients," Engineering ToolBox, Retrieved Jan. 19, 2024, https://www.engineeringtoolbox.com/accoustic-sound-absorption-d_68.html, 11 pages.

(Continued)

*Primary Examiner* — Kendall Dolly
(74) *Attorney, Agent, or Firm* — Edell, Shapiro & Finnan, LLC

(57) ABSTRACT

A method, computer system, and computer program product are provided for performing automated eavesdropping detection and remediation. A distance between a first and second wireless client device is determined with reference to a wireless access point based on wireless signals transmitted by the devices. A first and second signal loss are determined with reference to the first and second wireless client devices and the wireless access point. Material properties for any physical structures between the first and second wireless client devices are derived based on the signal losses. A sound attenuation is determined between the first and second wireless client devices based on the material properties. It is determined whether a first user of the first wireless client device can hear audio of a second user of the second wireless client device based on the sound attenuation determined between the first wireless client device and the second wireless client device.

20 Claims, 8 Drawing Sheets

(51) Int. Cl.
  *G10L 25/51* (2013.01)
  *H04W 12/02* (2009.01)
  *H04W 12/122* (2021.01)
  *H04M 1/19* (2006.01)

(56) References Cited

U.S. PATENT DOCUMENTS

| | | | |
|---|---|---|---|
| 10,403,302 B2* | 9/2019 | Fairey | G10L 17/02 |
| 11,038,881 B2* | 6/2021 | Brinckman | H04L 63/0876 |
| 2008/0281588 A1 | 11/2008 | Akagi et al. | |
| 2009/0097671 A1 | 4/2009 | Paradiso et al. | |
| 2014/0031062 A1* | 1/2014 | Gray | H04W 4/029 |
| | | | 455/456.1 |
| 2014/0122077 A1 | 5/2014 | Nishikawa et al. | |
| 2016/0337032 A1 | 11/2016 | Johnson et al. | |
| 2016/0338145 A1* | 11/2016 | Bhanage | H04W 52/0245 |
| 2016/0358602 A1* | 12/2016 | Krishnaswamy | G10L 15/20 |
| 2018/0020398 A1* | 1/2018 | Xie | H04W 48/16 |
| 2021/0219198 A1* | 7/2021 | Lin | H04W 36/304 |
| 2023/0078351 A1* | 3/2023 | Jun | G06N 3/084 |
| | | | 381/56 |

OTHER PUBLICATIONS

Rudd, R. et al., "Building Materials and Propagation," Ægis Systems Limited, Sep. 14, 2014, https://www.ofcom.org.uk/data/assets/pdf_file/0016/84022/building_materials_and_propagation.pdf, 123 pages.

Computer Music: "How to measure your room's acoustics with Room EQ Wizard," Computer Music Magazine, Dec. 31, 2014, https://www.musicradar.com/tuition/tech/how-to-measure-your-rooms-acoustics-with-room-eq-wizard-612779, 17 pages.

MAS Environmental LTD: "Sound Propagation Level Calculator," NoiseTools.net, Retrieved Jan. 19, 2024, https://noisetools.net/barriercalculator?barrier=[1,2.5,8.2], 4 pages.

* cited by examiner

SPEECH CONFIDENTIALITY MONITORING AND ALERTING

TECHNICAL FIELD

The present disclosure relates generally to automated eavesdropping detection and remediation.

BACKGROUND

In many office environments, assessing the security of a location for a confidential or sensitive discussion can be difficult. New trends such as the use of open-plan workspaces and electronic communication channels have contributed toward the inadvertent exposure of sensitive and confidential information through eavesdropping. When individuals engage in discussions and exchange information within supposedly secure rooms, they may be unaware that their conversations can be overheard by unintended listeners. This poses a significant threat to the confidentiality of proprietary data, trade secrets, and strategic plans, potentially leading to intellectual property theft, unauthorized access, or corporate espionage.

DETAILED DESCRIPTION

Overview

Figure 1:
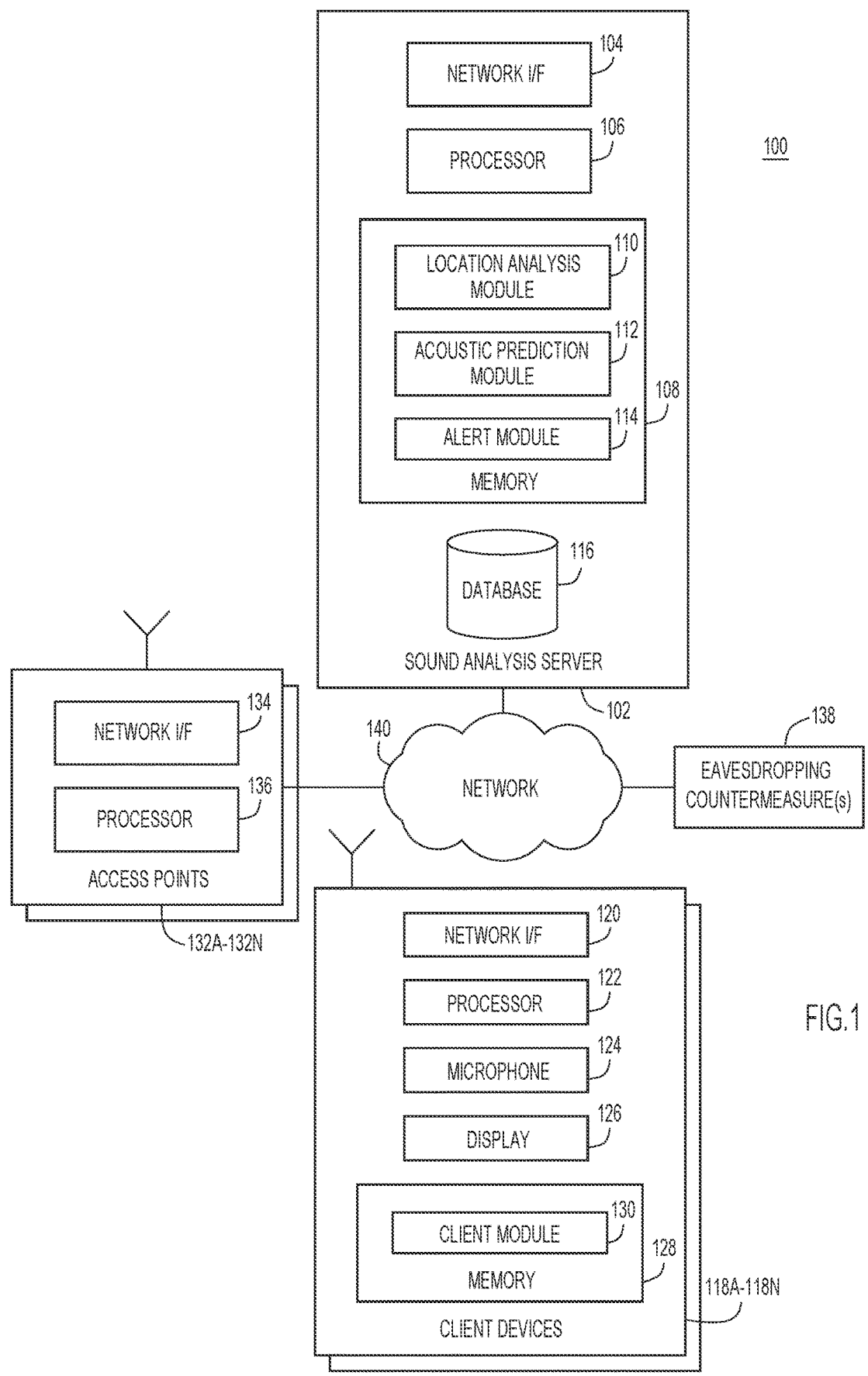
FIG. 1 is a block diagram depicting a network environment for performing automated eavesdropping detection and remediation, according to an example embodiment.

According to one embodiment, techniques are provided for performing automated eavesdropping detection and remediation. A distance between a first wireless client device and a second wireless client device is determined with reference to a wireless access point based on wireless signals transmitted by the first wireless client device and the second wireless client device. A first signal loss with reference to the first wireless client device and the wireless access point and a second signal loss with reference to the second wireless client device and the wireless access point are determined. One or more material properties for one or more physical structures between the first wireless client device and the second wireless client device are derived based on the first signal loss and the second signal loss. A sound attenuation is determined between the first wireless client device and the second wireless client device based on the one or more material properties. It is determined whether a first user of the first wireless client device can hear audio of a second user of the second wireless client device based on the sound attenuation determined between the first wireless client device and the second wireless client device.

Example Embodiments

Present embodiments relate to speech confidentiality, and more specifically, to automated eavesdropping detection and remediation. In a setting that involves a shared space, such as an office, it can be difficult to discuss confidential or other sensitive subject matter without the possibility of being overheard by undesired parties. For example, when an individual joins a video conference session from an office's conference room, other inhabitants of the office may be able to hear the individual speaking, even when the doors to the conference room are closed. Many common building materials, such as gypsum board, wood, concrete, and tile, can be fairly reflective rather than absorptive with regard to sound, lending to eavesdropping opportunities in buildings constructed of such materials. Conventional solutions for providing privacy in buildings can be costly and typically require physical modifications to buildings, such as the installation of foam padding, carpet, or other costly soundproofing options.

To address this problem, the embodiments presented herein provide an improved approach to detecting and remediating any potential eavesdropping activities. In particular, since individuals typically use wirelessly-networked computing devices to participate in communication sessions, the strength of wireless signals can be used as a proxy for estimating the building materials in a location, and accordingly, for estimating the sound attenuation in that location. Thus, when two users of wirelessly-networked devices have relatively strong connections (e.g., according to a received signal strength indicator (RSSI) or other metric) to each other or to one or more nearby access points, then it can be determined that one of the users may be able to overhear the other user. Triangulation techniques can also be employed to determine the distance between users of two wirelessly-networked devices, and in combination with the signal strength data, the types and/or thicknesses of building materials that are between the users' devices can be determined, enabling for the sound attenuation between the users to be likewise be determined. Thus, if a sound intensity from one user's location to another user's location exceeds a threshold value (e.g., in decibels (dB)), then present embodiments provide a mechanism for identifying that a user can potentially be overheard, as well as approaches for remediating any potential eavesdropping.

Thus, present embodiments improve the technical field of data security by preventing eavesdropping, thus securing confidential or other sensitive data from being accessed by unauthorized individuals. Moreover, the present embodiments can employ machine learning techniques that involve retraining and updating of machine learning models based on user feedback to improve the accuracy of the models over time, thus providing an iteratively improving approach to eavesdropping detection. Thus, present embodiments provide the practical application of improving data security by preventing unauthorized individuals from overhearing any conversations or other audio for which protection is desired.

It should be noted that references throughout this specification to features, advantages, or similar language herein do not imply that all of the features and advantages that may be realized with the embodiments disclosed herein should be, or are in, any single embodiment. Rather, language referring to the features and advantages is understood to mean that a specific feature, advantage, or characteristic described in connection with an embodiment is included in at least one embodiment. Thus, discussion of the features, advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages will become more fully apparent from the following drawings, description, and appended claims, or may be learned by the practice of embodiments as set forth hereinafter.

With reference now to FIG. 1, a block diagram is presented depicting a network environment 100 for performing automated eavesdropping detection and remediation, according to an example embodiment. As depicted, network environment 100 includes a sound analysis server 102, a plurality of client devices 118A-118N, a plurality of access points 132A-132N, and at least one eavesdropping countermeasure 138 that are in communication via a network 140. It is to be understood that the functional division among components have been chosen for purposes of explaining various embodiments and is not to be construed as a limiting example.

Sound analysis server 102 includes a network interface (I/F) 104, at least one processor (computer processor) 106, memory 108 (which stores instructions for a location analysis module 110, an acoustic prediction module 112, and an alert module 114), and a database 116. In various embodiments, sound analysis server 102 may include a rack-mounted server, laptop, desktop, smartphone, tablet, or any other programmable electronic device capable of executing computer readable program instructions. Network interface 104 may be a network interface card that enables components of sound analysis server 102 to send and receive data over a network, such as network 140. Sound analysis server 102 may be configured to analyze radio data obtained from client devices 118A-118N in order to identify whether users in an environment can overhear other users.

Location analysis module 110, acoustic prediction module 112, and alert module 114 may include one or more modules or units to perform various functions of the embodiments described below. Location analysis module 110, acoustic prediction module 112, and alert module 114 may be implemented by any combination of any quantity of software and/or hardware modules or units, and may reside within memory 108 of sound analysis server 102 for execution by a processor, such as processor 106.

Location analysis module 110 may determine the physical locations of client devices (e.g., client devices 118A-118N) in an environment. The locations can be determined as absolute locations (e.g., geographical coordinates) or as relative locations (e.g., a first client device is fifty feet away from a second client device, etc.). In some embodiments, the locations of client devices can be manually registered with location analysis module 110 by a user providing an indication of a location of each client device. The user can provide a room name in which the user is occupying, geographical coordinates of a client device (e.g., as obtained by a global positioning system (GPS) module of a client device) or according to any other mechanism for reporting a physical location of a client device. In some embodiments, location analysis module 110 analyzes data obtained from client devices 118A-118N and/or access points 132A-132N in order to identify locations of client devices 118A-118N using triangulation techniques, such as signal strength triangulation and/or time-of-flight triangulation. Time-of-flight triangulation can be performed by time difference of arrival techniques, in which the time required for a signal to travel from a client device to multiple access points is measured. Additionally or alternatively, round-trip time approaches can be employed, in which the time required for a signal to travel from a client device to the access point and back is measured.

Acoustic prediction module 112 performs actions that include determining material properties for physical structures that are between wireless client devices (e.g., any of client devices 118A-118N), and based on the material properties, determining sound attenuation from one client device to another. As used herein, sound attenuation refers to the energy loss of sound propagation over a distance (e.g., from one client device to another). Sound attenuation can be used to determine whether one person (a listener) can hear another person (a speaker) talking based on the volume of the speaker's voice.

Acoustic prediction module 112 may use as input the locations of client devices (e.g., any two or more of client devices 118A-118N) as well as wireless signal loss data of each client device with respect to one or more wireless access points (e.g., any of access points 132A-132N). The wireless signal loss data can be measured as a received signal strength indicator (RSSI), which can be measured in any suitable units, such as decibels (dB). Since materials that contribute to wireless signal loss may also contribute to sound attenuation, the wireless signal loss data can generally be used as a proxy for estimating the sound attenuation from one client device to another. That is, if there is a substantial wireless signal loss between two client devices (or between a first client device and an access point, and/or between the access point and a second client device), it can be predicted that there is also a corresponding sound attenuation as between the first client device and the second client device. For example, if two client devices have locations on approximately opposite sides of an access point, and either (or both of) their wireless signal losses surpass a threshold loss, then it is unlikely that a user of one client device can perceive a user of another client device speaking.

Acoustic prediction module 112 employs one or more models to determine material properties between two client devices (e.g., any of client devices 118A-118N) that match or is consistent with the wireless signal loss data. In some embodiments, an estimation model may be employed that selects different combinations of materials and thicknesses of those materials, and based on their material properties with respect to any interactions with electromagnetic radiation in the spectra utilized for wireless communications, determines whether a given material or combination of materials (e.g., a layer of a first material followed by a layer of a second material) at particular thicknesses matches or is consistent with the wireless signal loss data. For example, different material type (e.g., gypsum, wood, concrete, steel, glass, plastic, etc.) and different thicknesses for each material, including one material type or two or more layers of different material types, can be modeled to determine whether a particular combination of materials, thicknesses, and layers (including one layer or two or more layers) matches or is consistent with the wireless signal loss. Thus, for example, acoustic prediction module 112 can determine that a given wireless signal loss most closely is consistent with a wood layer of eight inches, a gypsum layer of two inches in combination with a concrete layer of six inches, or any other possible configuration of materials, thickness, and layers.

In some embodiments, acoustic prediction module 112 may employ one or more machine learning models to determine material properties between client devices based on wireless signal loss data. The one or more machine learning models can include a regressive model, support vector machine, neural network, or other suitable model, and can be trained using training data that includes examples of wireless signal loss data and corresponding material properties of the building materials through which those wireless signals passed. Thus, the model can be trained to determine material properties based on inputs of wireless signal loss data.

Acoustic prediction module 112 may be configured to estimate sound attenuation based on the determined material properties. The sound attenuation level of the material properties can be determined based on the amount that a material or combination of materials (e.g., two or more layers) at given thicknesses dampen sound. Sound attenuation can be based on a predetermined relationship between material properties and sound attenuation, which can be empirically derived. Additionally or alternatively, a machine learning model can be trained to determine sound attenuation for various building materials based on training data that includes examples of building material properties and corresponding sound attenuation. Thus, a machine learning model can predict sound attenuation for material properties for which an empirically-derived example was not obtained by learning sound attenuation patterns for various other examples of building material properties.

Alert module 114 may analyze sound attenuation levels between two or more client devices (e.g., any of client devices 118A-118N) in order to determine whether a user at one client device can overhear another user at another client device who is speaking. However, it should be understood that the embodiments presented herein are not limited to sensitive or confidential data that can be overheard by a person speaking, as the embodiments presented herein also apply to a client device playing live or prerecorded audio that may be deemed sensitive or confidential. In general, alert module 114 causes eavesdropping remediation instructions to be issued in response to determining that a user at a client device can be overheard by a user at another client device. In some embodiments, the instructions can include an alert that can be presented at a user's client device in order to make the user aware that another user can overhear their speech. In some embodiments, alert module 114 transmits instructions that cause a visual alert to be activated, which can include a light source that activates (e.g., a light emitting diode (LED) or other light, which can be any desired color (e.g., white, red, etc.). In some embodiments, the visual alert can flash according to a desired pattern. Additionally or alternatively, alert module 114 can activate other eavesdropping countermeasures, such as causing a door to be closed (e.g., by activating an automatic door mechanism or disabling a magnetic that is holding a door open), or activating an acoustic countermeasure such as a white noise generator or similar speaker that generates sound in one or more locations in order to render a user's speech unintelligible.

Alert module 114 may determine whether a user can be overheard based on the degree of attenuation of sound generated by the user, which in turn can be based on an actual or predetermined volume of the sound generated by the user. In some embodiments, a predetermined human speech volume is used by alert module 114 to determine whether a user can be overheard. In other embodiments, a user can provide a sample of their speaking voice in order to enable alert module 114 to determine whether the user may be overheard. In yet other embodiments, the volume of speech of a user may be actively monitored (e.g., by the user's client device) in order to determine whether, at a given time, the user may be overheard by other users. Alert module 114 may determine that a user can be overheard when the estimated sound attenuation at another user's device surpasses a predetermined volume. It should be understand that the predetermined volume does not necessarily need to be below the human threshold of hearing, as speech that has been attenuated beyond a particular amount may still be sensed by human hearing but can be muffled to such a degree that the speech is effectively unintelligible.

Database 116 may include any non-volatile storage media known in the art. For example, database 116 can be implemented with a tape library, optical library, one or more independent hard disk drives, or multiple hard disk drives in a redundant array of independent disks (RAID). Similarly, data in database 116 may conform to any suitable storage architecture known in the art, such as a file, a relational database, an object-oriented database, and/or one or more tables. Database 116 may store data including location data of client devices, wireless signal loss data, material property data for various building materials, and the like, which can be utilized by the modules in memory 108 in accordance with the embodiments presented herein.

Client devices 118A-118N may each include a network interface (I/F) 120, at least one processor (computer processor) 122, a microphone 124, a display 126, and memory 128 (which stores instructions for a client module 130). In various embodiments, client devices 118A-118N may each include a rack-mounted server, laptop, desktop, smartphone, tablet, or any other programmable electronic device capable of executing computer readable program instructions. Network interface 120 enables components of each client device 118A-118N to send and receive data over a network, such as network 140. Client devices 118A-118N may each enable users to participate in conference sessions in which multimedia data is transmitted (e.g., video presentations) via microphone 124 for capturing speech of a user and via display 126 for presenting multimedia data to a user. Client devices 118A-118N may provide signal strength data to sound analysis server 102, which can include relative signal losses between any of client devices 118A-118N and/or access points 132A-132N.

Client module 130 may include one or more modules or units to perform various functions of the embodiments described below. Client module 130 may be implemented by any combination of any quantity of software and/or hardware modules or units, and may reside within memory 128 of any of client devices 118A-118N for execution by a processor, such as processor 122. Client module 130 may perform various operations to enable a user of each client device 118A-118N to participate in communication sessions by exchanging multimedia data between client devices 118A-118N, including video data and/or audio data. In some embodiments, client module 130 may present alerts to a user to indicate when the user may be overheard by another user.

Access points 132A-132N can include any wireless access points that enable the exchange of data with regard to wirelessly-networked devices (e.g., client devices 118A-118N). access points 132A-132N may be single-band and/or dual-band devices (e.g., devices operating in the 2.4 GHz band and/or 5 GHz band or other bands). Access points 132A-132N may collect and provide any desired wireless signal data to sound analysis server 102, including wireless signal loss data with respect to other access points 132A-132N and/or any client devices 118A-118N. each access point 132A-132N may include one or more network interfaces (I/F) 134 and one or more computer processors 136 for performing networking and/or other operations.

Eavesdropping countermeasure(s) 138 can include any electronic alert system to warn for the presence of potential eavesdroppers and/or to prevent eavesdropping. In some embodiments, eavesdropping countermeasure(s) 138 can include physical countermeasures, such as automated doors or other barriers that can be activated to provide additional barriers between client devices 118A-118N. additionally or alternatively, eavesdropping countermeasure(s) 138 can include visual-based alerts (e.g., lights), haptic feedback (e.g., vibrations by a client device or other device worn by a user such as a smartwatch), sound-based alerts (e.g., a siren or beep emitted by a speaker), and/or sound-based mitigation systems (e.g., white noise generators).

Network 140 may include a local area network (LAN), a wide area network (WAN) such as the Internet, or a combination of the two, and includes wired, wireless, or fiber optic connections. In general, network 140 can be any combination of connections and protocols known in the art that will support communications between sound analysis server 102, client devices 118A-118N, access points 132A-132N, and/or eavesdropping countermeasure(s) 138 via their respective network interfaces in accordance with the described embodiments.

Figure 2:
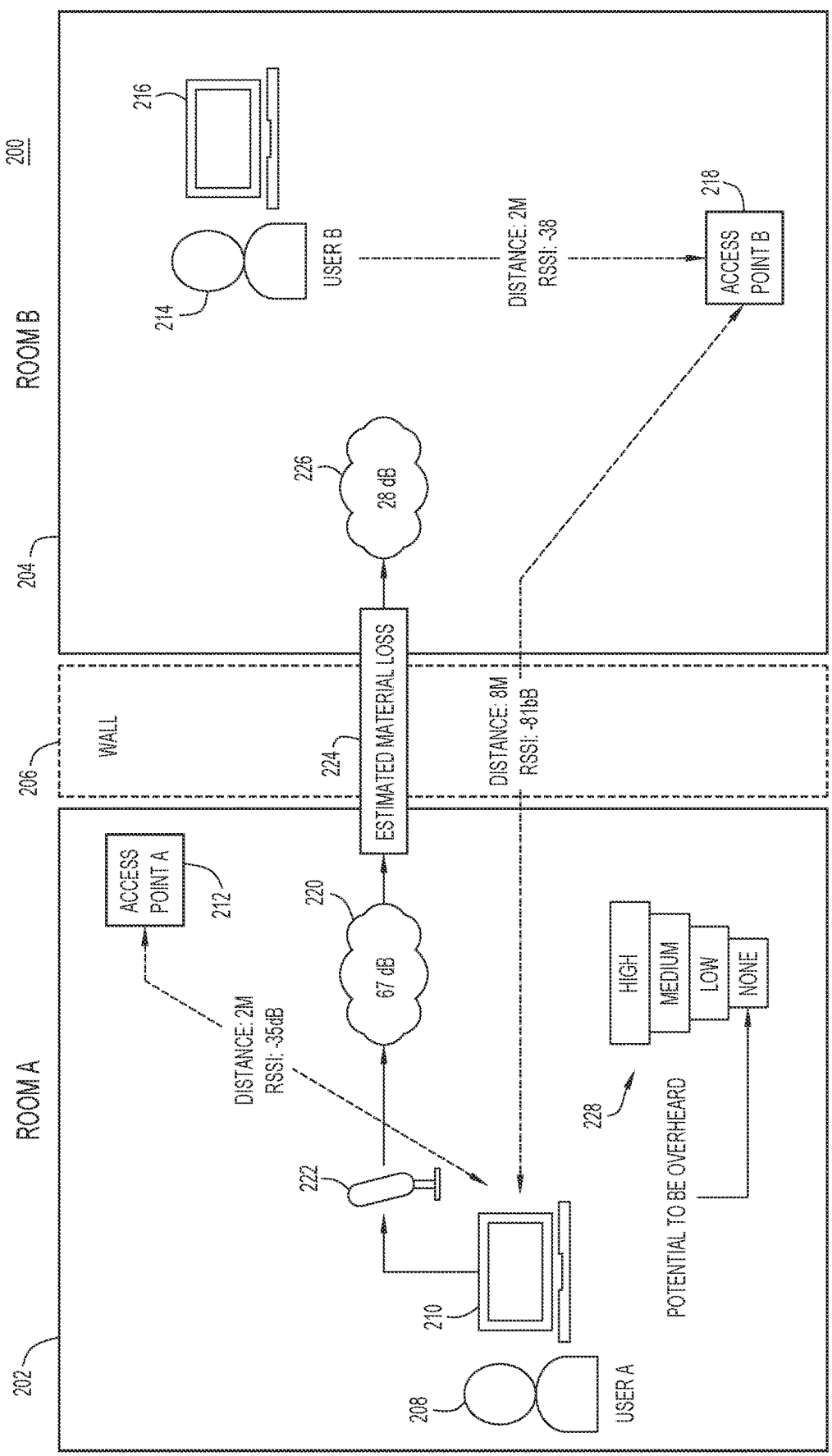
FIG. 2 is a diagram depicting an environment that is analyzed to identify potential eavesdropping, according to an example embodiment.

With reference now to FIG. 2, a diagram is provided of an environment 200 that is analyzed to identify potential eavesdropping according to an example embodiment. As depicted, environment 200 includes two rooms 202 and 204 ("Room A" and Room B" respectively) separated by a wall 206. Room 202 includes a user 208 ("User A") at a first client device 210, as well as a first access point 212 ("Access Point A"); room 204 includes a user 214 ("User B") at a second client device 216, as well as a second access point 218 ("Access Point B").

Based on known positions of client device 210, access point 212, client device 216, and access point 218, as well as wireless signal loss data collected by the respective devices, it can be determined that client device 210 is two meters from access point 212 and experiences a wireless signal loss of −35 dB with regard to access point 212. Similarly, client device 216 is two meters from access point 218 and experiences a wireless signal loss of −38 dB with regard to access point 218. Additionally, client device 210 is eight meters from access point 218 and experiences a wireless signal loss of −81 dB. Based on an analysis of the distance and wireless signal loss data, the material properties of wall 206 can be determined, which can be used to predict the sound attenuation of wall 206. In particular, since client device 210 only experiences a signal loss of −35 dB to access point 212, the signal loss of −81 dB to access point 218 cannot be explained by the distance alone (eight meters between client device 210 and access point 218), so wall 206 causes some additional loss that can be determined according to a model that predicts the material properties of wall 206. Based on these properties, a sound attenuation can therefore be predicted.

In the depicted example of environment 200, a volume 220 of speech of user 208 can be determined via microphone 222. In this example embodiment, the speech of user 208 is measured at a volume 220 of 67 dB. Based on the estimated material loss 224 (e.g., via sound attenuation), the speech on the other side of wall 206 is determined to a volume 226 of 28 dB. As this volume corresponds to below a whisper, there is no risk of being overheard (as indicated by the risk indicator graphic 228).

Figure 3:
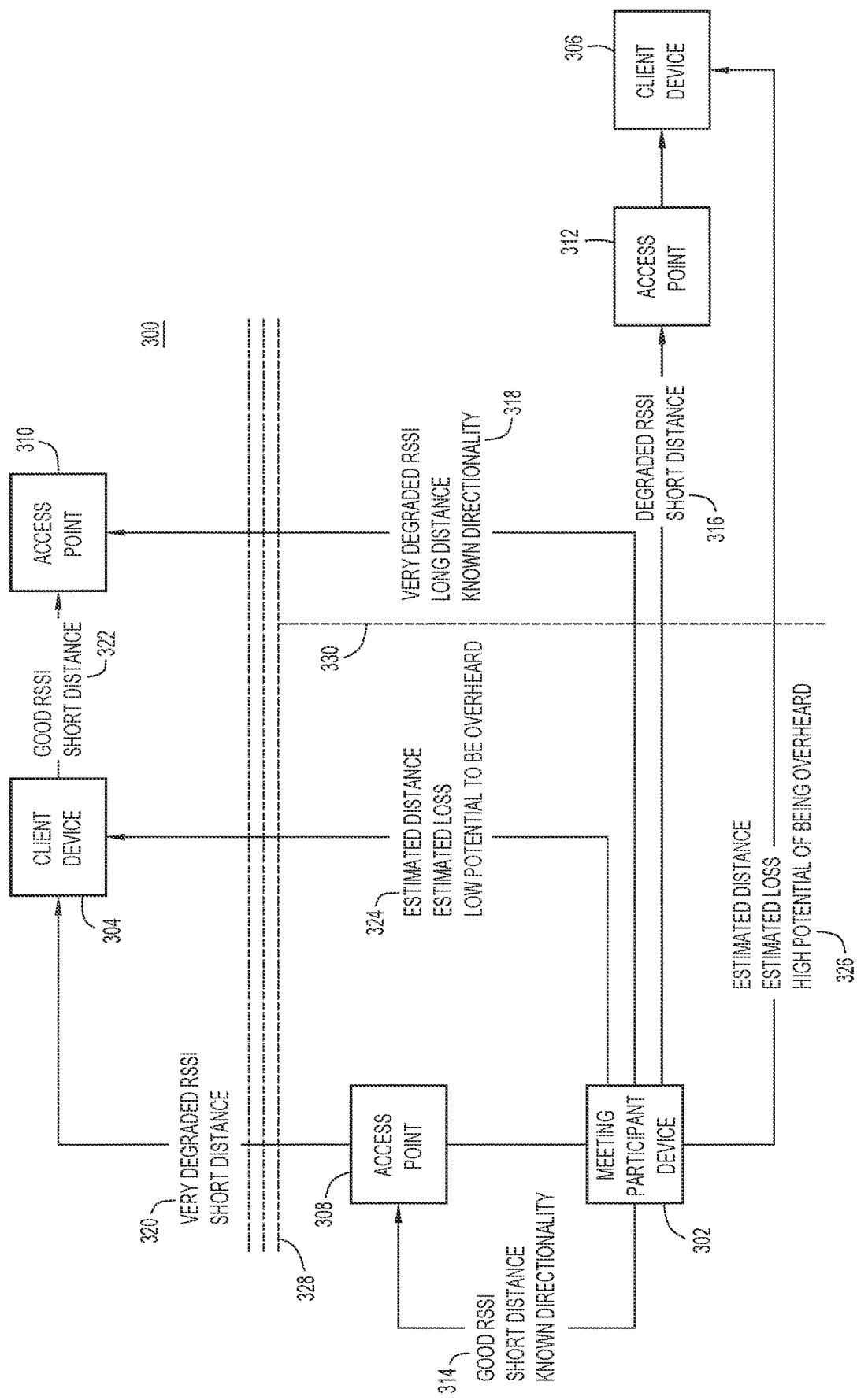
FIG. 3 is a diagram depicting an environment that is analyzed to identify potential eavesdropping, according to an example embodiment.

With reference now to FIG. 3, a diagram is provided depicting an environment 300 that is analyzed to identify potential eavesdropping, according to an example embodiment. As depicted, environment 300 includes a meeting participant device 302 (e.g., a client device used by a user who is speaking), two other client devices 304 and 306, access points 308, 310, and 312, and building materials 328 and 330 (e.g., walls or other physical structures).

As shown, meeting participant device 302 can collect wireless signal loss data with respect to access points 308, 310, and 312. Each access point 308, 310, and 312 may collect wireless signal loss data with respect to the various clients connected to the respective access point. Access point 308 may obtain wireless metrics 314, which indicate the following characteristics with respect to meeting participant device 302: there is a good RSSI (indicating little wireless signal loss), a short distance to access point 308, and a known directionality (as determined based on known locations of devices and access points). Access point 312 may obtain wireless metrics 316 with respect to meeting participant device 302 that indicate that there is a degraded RSSI (indicating some wireless signal loss) and a short distance to access point 312. Access point 310 may obtain wireless metrics 318 with respect to meeting participant device 302 that indicate that there is a very degraded RSSI (e.g., a substantial wireless signal loss), a long distance, and a known directionality. Additionally, wireless metrics 320 may indicate that there is a very degraded RSSI and a short distance between access point 308 and client device 304. Wireless metrics 322 may indicate that there is a good RSSI and a short distance between client device 304 and access point 310. In some embodiments, rather than using access points, another device can be employed for the purpose of wireless data analysis. The device can be a wireless client device, or may include a video conferencing device, a computing device integrated into a fixture, wall, or lighting device, or a dedicated device for obtaining and analyzing wireless data in accordance with the embodiments presented herein.

By analyzing the relative location data of meeting participant device 302, client devices 304 and 306, and access points 308, 310, and 312, in combination with the wireless signal loss data, estimated metrics 324 and 326 can be obtained, which predict the distance, wireless signal loss, and potential to be overheard between meeting participant device 302 and client devices 304 and 306, respectively. In the depicted example, estimated metric 324 indicates that meeting participant device 302 has a low potential to be overheard by a user of client device 304, as building materials 328 cause a very degraded RSSI between access point 308 and client device 304, which may be determined to correlate to a low degree of sound attenuation. In contrast, estimated metric 326 indicates a high potential of a user of meeting participant device 302 being overheard by a user of client device 306, as there is only a relatively low amount of RSSI degradation and a short distance from meeting participant device 302 to access point 312, thus indicating that building materials 330 will not sufficiently attenuate sound.

Figure 4:
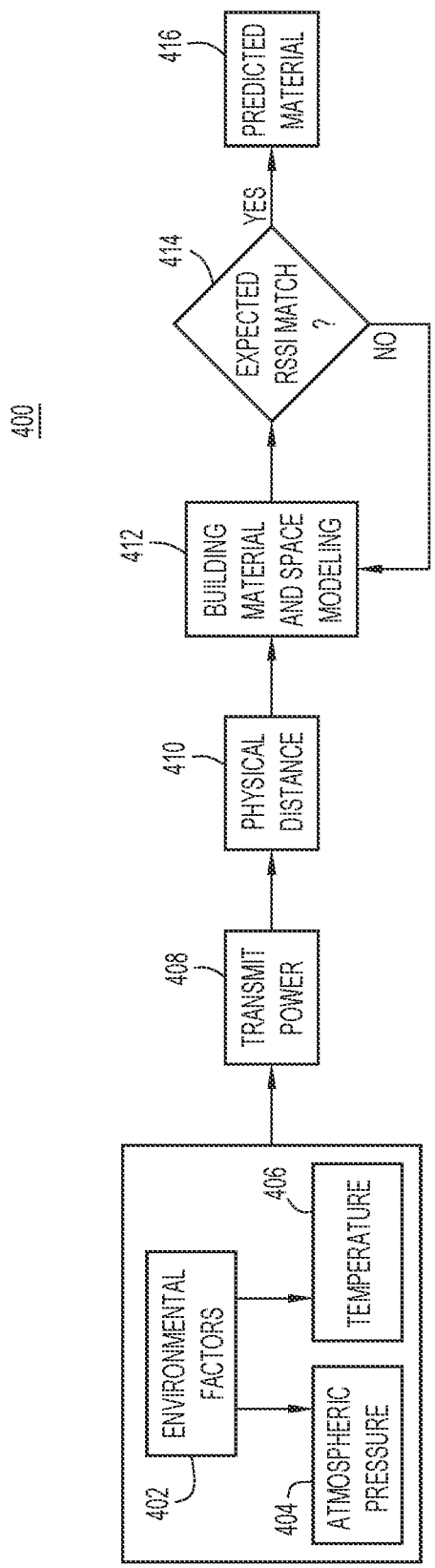
FIG. 4 is a flow diagram depicting a material prediction model, according to an example embodiment.

FIG. 4 is a flow diagram depicting a material prediction model 400, according to an example embodiment. The material prediction model 400 would be executed by the sound analysis server 102 (FIG. 1). As depicted, material prediction model 400 includes an environmental factors component 402, a transmit power component 408, a physical distance component 410, a building material and space modeling component 412, an RSSI match component 414, and a predicted materials 416 (as output of material prediction model 400). The output of environmental factors component 402, transmit power component 408, physical distance component 410, and building material and space modeling component 412 can be utilized by RSSI match component 414 to determine that building material and space modeling component 412 has identified building material properties that explain the wireless signal loss data.

Environmental factors component 402 may collect, organize, and analyze data relating to environmental factors that can affect wireless transmission strength, which can include atmospheric pressure data 404, temperature data 406, and/or any other data regarding the environment of the wireless devices being analyzed that may be relevant to predicting material properties. Environmental factors component 402 may obtain the environmental factor data from a network-accessible resource, such as a database that stores local meteorological data.

Transmit power component 408 may obtain data that describes the transmit power for any wireless devices, including client devices and/or access points. The transmit power can include power levels for individual antennae, including different bands such as 2.4 GHZ and 5 GHZ. The transmit power data can be obtained from the devices by a server (e.g., sound analysis server 102).

Physical distance component 410 may analyze location data of wireless devices (e.g., client devices and/or access points) in order to determine the distances between the wireless devices. Triangulation or other similar techniques may be performed in order to determine distances between devices. In some embodiments, the locations of devices may be predetermined, as access points may be installed in known locations and client devices may be used at particular locations (e.g., particular desks, offices, etc.).

Building material and space modeling component 412 may model different combinations of building materials and thicknesses in combination with the data obtained from environmental factors component 402, transmit power component 408, and/or physical distance component 410 in order to identify a particular combination of building material properties that matches the wireless signal loss data. In some embodiments, building material and space modeling component 412 iteratively calculates different building material properties to provide to RSSI match component 414 to determine whether there is a match; if building material properties provide a predicted wireless signal loss that approaches the actual wireless signal loss, a next iteration may make fewer modifications to the building material properties, such as adjusting the thickness of a building material by a smaller amount as compared to a previous iteration, until a match is found. In some embodiments, building material and space modeling component 412 is a machine learning model that is provided with training data that comprises common building construction practices, which can be specific to a particular location, architecture, building type, and the like.

RSSI match component 414 evaluates each set of predicted material properties from building material and space modeling component 412 to determine whether there is a match with regard to the observed RSSI data. If there is a match, which can be within a predetermined threshold of the observed RSSI data, then those predicted materials 416 whose properties would explain the observed RSSI values can be utilized as input for another model (e.g., eavesdropping detection model 500, which is depicted and described in further detail below with reference to FIG. 5) to determine whether a user of a client device can be overheard by another user.

Figure 5:
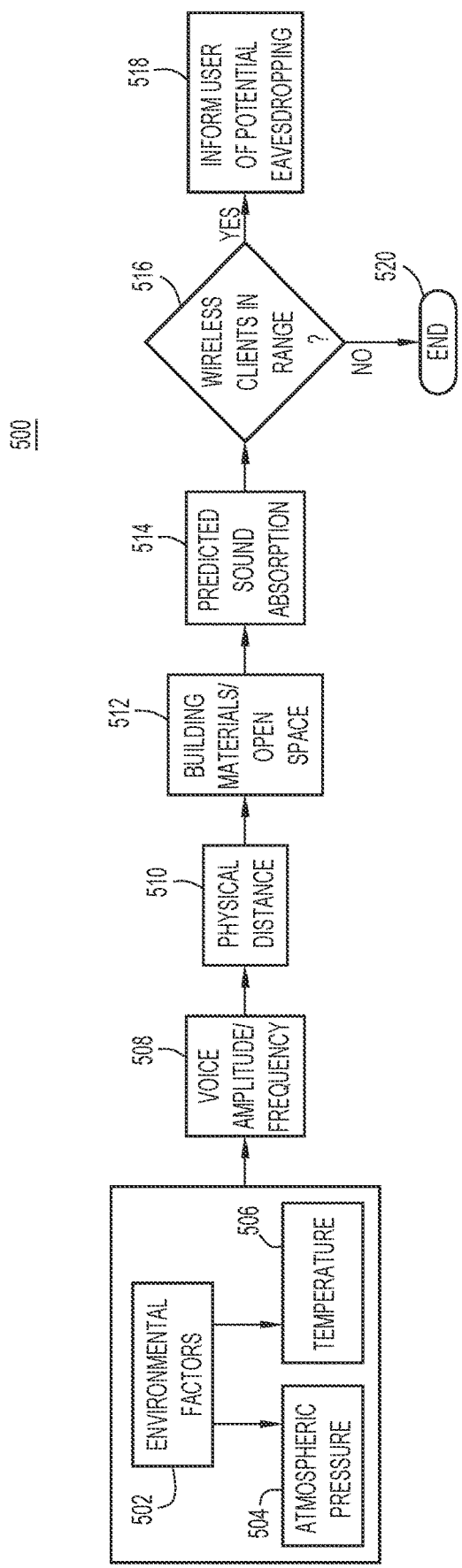
FIG. 5 is a flow diagram depicting an eavesdropping detection model, according to an example embodiment.

FIG. 5 is a flow diagram depicting an eavesdropping detection model 500, according to an example embodiment. The eavesdropping detection model 500 would be executed by the sound analysis server 102 (FIG. 1). As depicted, eavesdropping detection model 500 includes an environmental factors component 502, a voice amplitude/frequency component 508, a physical distance component 510, a build materials/open space component 512, a predicted sound absorption component 514, and a wireless client range determination component 516.

The environmental factors component 502 may obtain data relating to any environmental factors that affect sound transmission, such as atmospheric pressure 504 and temperature 506. These can be obtained directly from a database that stores current meteorological observations, or from another model, such as material prediction model 400.

The voice amplitude/frequency component 508 may include actual or predetermined voice data for a user's speech. The amplitude and/or frequency data can be predetermined based on average speaking amplitude and/or frequencies of individuals, or can be obtained from a specific user by prompting the user to provide a sample of their voice. In some embodiments, the voice amplitude and/or frequency data can be obtained automatically during a communication session by sampling a user's speech when the user is naturally speaking to other participants.

The physical distance component 510 may obtain or determine data describing the relative locations of wireless devices, including any two or more client devices and/or access points. This data can be predetermined based on known locations or obtained from another model, such as material prediction model 400. Likewise, building materials/open space component 512 may obtain data from material prediction model 400 that indicates the estimated building materials with respect to the locations of wireless devices.

Predicted sound absorption component 514 may predict the sound attenuation between two selected client devices based on inputs from environmental factors component 502, voice amplitude/frequency component 508, physical distance component 510, and/or building materials/open space component 512. Predicted sound absorption component 514 thus predicts a sound attenuation coefficient that can be applied to a user's output speech at one client device to predict the reduction in volume of the speech as heard from a location of another client device. In particular, the sound attenuation coefficient can be a function of the sound attenuation that is caused by sound traveling over the distance between the user who is speaking and the user who is listening in view of the environmental factors that affect sound transmission, combined with any sound attenuation caused by physical impediments based on the material properties that have been determined for any structural impediments between the two users.

Wireless client range determination component 516 receives the predicted sound attenuation data and analyzes the data with respect to one or more client devices to determine if users of those client devices can potentially overhear a user's speech at another client device. If a user may be overheard, then the user can be informed of potential eavesdropping at operation 518. Otherwise, execution of the eavesdropping detection model 500 may terminate at operation 520. However, it should be appreciated that the eavesdropping detection model 500 may be utilized according to any scheduled or ad hoc basis; in some embodiments, eavesdropping detection model 500 may be executed whenever a user's speech is detected at a client device or in response to user input that indicates that a user is discussing topics of a sensitive or confidential nature.

Figure 6:
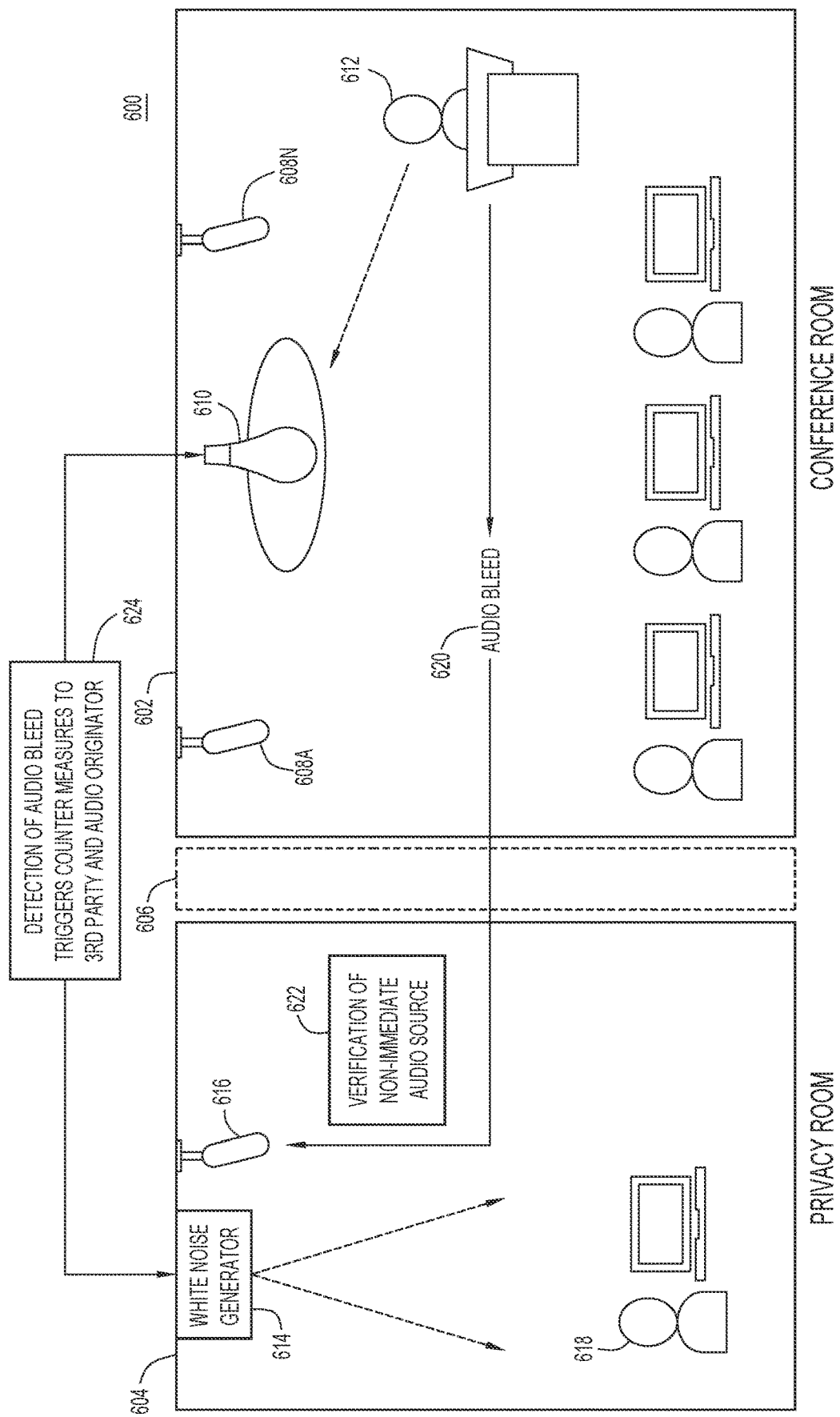
FIG. 6 is a diagram depicting an eavesdropping mitigation environment, according to an example embodiment.

FIG. 6 is a diagram depicting an eavesdropping mitigation environment 600, according to an example embodiment. As depicted, eavesdropping mitigation environment 600 includes a conference room 602 and a privacy room 604 separated from each other by a structure 606. Conference room 602 may include one or more microphones 608A-608N, a visual indicator 610, and can be occupied by one or more individuals, including a presenter 612. Privacy room 604 may include a white noise generator 614, a microphone 616, and can be occupied by a user 618.

According to the embodiments presented herein, when presenter 612 utters speech that can include potentially sensitive or confidential information, sound attenuation of the speech can be calculated to determine whether user 618 in privacy room 604 can overhear the speech. The audio bleed 620 may thus be detected, and can be cross-referenced at operation 622 to verify whether any speech heard in privacy room 604 corresponds to speech of the presenter 612 (as determined based on audio data collected by microphones 608A-608N), or if sound heard in privacy room 604 comes from another source. If the audio bleed 620 is detected and confirmed to be audible to user 618, then at operation 624 countermeasures are triggered to the third party (e.g., the user 618) and/or the audio originator (e.g., the presenter 612). These countermeasures can include activation of visual indicator 610 (which can emit light in a sustained manner, flash, etc.), and/or activation of white noise generator 614 (which can emit sound that renders any audio bleed 620 unintelligible to user 618).

Figure 7:
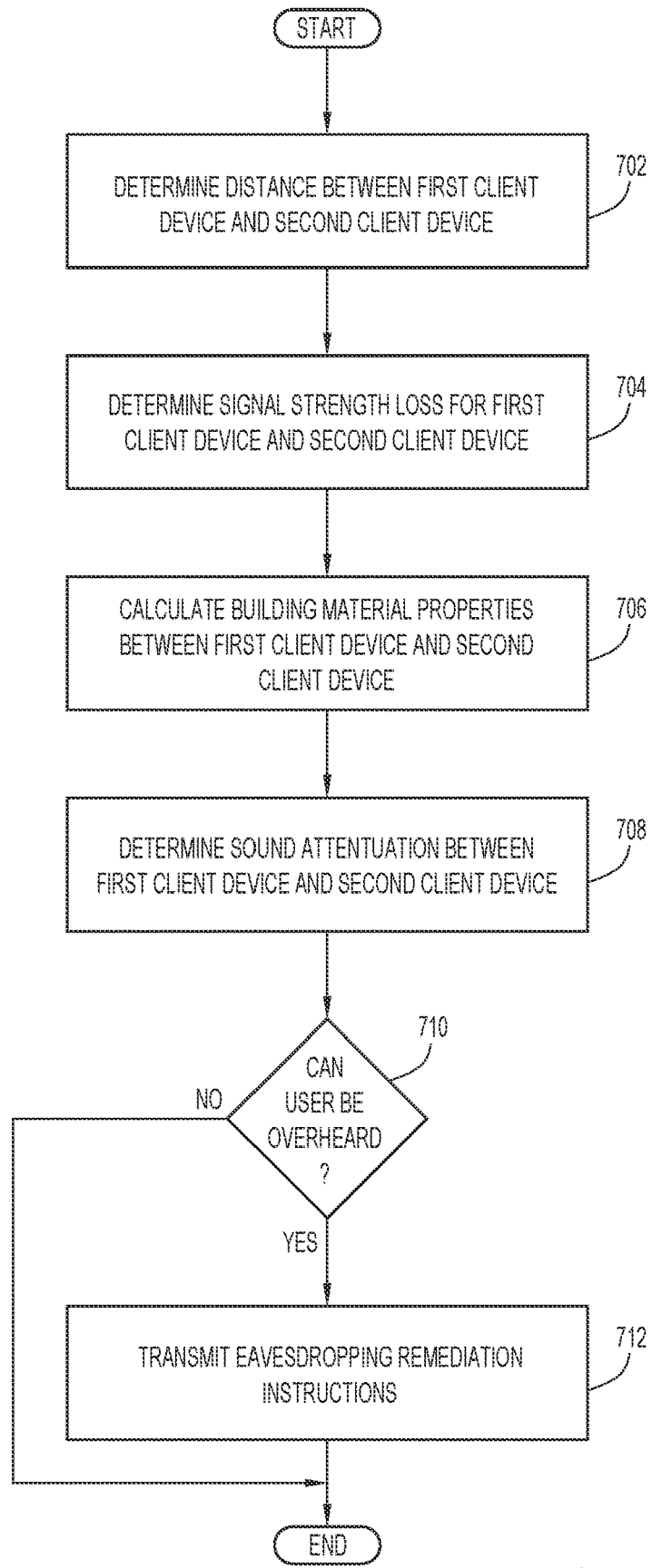
FIG. 7 is a flow chart of a method for detecting and remediating eavesdropping, according to an example embodiment.

FIG. 7 is a flow chart of a method 700 for detecting and remediating eavesdropping, according to an example embodiment.

The distance between a first client device and second client device is determined at operation 702. This distance can be predetermined based on known locations of the client devices, or can be computed by sampling radio data from the client devices' wireless transceivers and performing any triangulation techniques. In some embodiments, the distance between devices is determined using the distance between each device and one or more intermediate devices (e.g., other client devices or access points) using directionality data. Thus, by applying trigonometric techniques based on the angles and distance of the client devices with respect to other devices, the direct distance between the two client devices can be obtained.

The signal strength loss for the first and second client devices is determined at operation 704. The signal strength loss can be determined with respect to each other, or with respect to one or more other wireless devices (e.g., other client devices or access points). Thus, the actual signal strength loss between the first and second client devices can be estimated or obtained. In some embodiments, characteristics of the wireless devices are analyzed to determine baseline signal strength levels for each device, which can be a function of each device's specific hardware configurations. Features such as the antenna size, sensitivity, configuration (e.g., voltage levels), chipsets employed, drivers that are implemented, signal to noise ratio levels, and the like can be assessed to determine the expected signal strength loss of devices over a given range. Devices can be tested to determine baseline signal strength levels on a per-device basis or the results of testing one device can be utilized for another device having a same or substantially similar configuration. In some embodiments, differences for various configuration options can be determined and an untested device can be assessed based on the configuration differences between the untested device and one or more previously-tested devices. The baseline signal strength levels can be tested from inside a same room as each device and/or from another room (e.g., by obtaining data from a point in which there is at least one structural impediment (e.g., a wall) between the wireless device and the point of testing).

Building material properties between the first client device and second client device are determined at operation 706. Based on the distances between the client devices and the signal strength loss, a model can compute building material properties for any intervening structures that would explain the signal strength loss given the distance between the devices. In various embodiments, iterative models and/or machine learning models can be employed to predict the building material properties with respect to the wireless signal loss.

The sound attenuation between the first client device and the second client device is determined at operation 708. Based on the predicted building material properties, the sound attenuation caused by the building materials intervening between the first and second client device can be estimated.

Operation 710 determines whether the user who is speaking can be overheard by the other user. A user's actual or estimated speaking volume can be obtained, and the sound attenuation data can be applied to determine the volume of the user's speech from the perspective of the other user. If the speaking user cannot be overheard, then method 700 may terminate. Otherwise, eavesdropping remediation instructions are transmitted at operation 712. These instructions can alert the user who is speaking to the possibility of an eavesdropper, and/or can cause eavesdropping countermeasures to be activated, such as activation of a visual indicator, a white noise generator, and the like.

Figure 8:
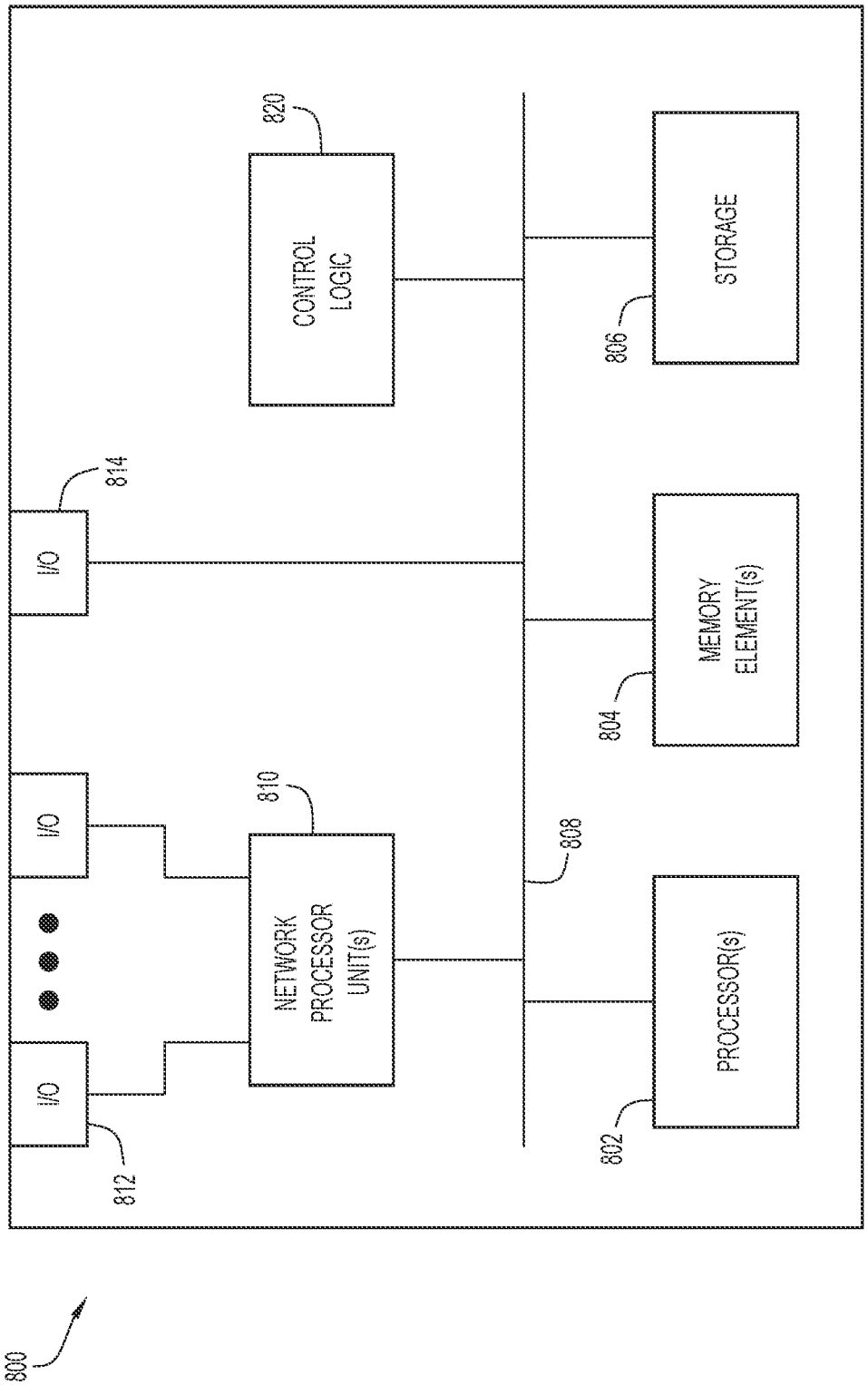
FIG. 8 is a block diagram of a device that may be configured to perform operations relating to automated eavesdropping detection and remediation, as presented herein.

Referring now to FIG. 8, FIG. 8 illustrates a hardware block diagram of a computing device 800 that may perform functions associated with operations discussed herein in connection with the techniques depicted in FIGS. 1-7. In at least one embodiment, the computing device 800 may include one or more processor(s) 802, one or more memory element(s) 804, storage 806, a bus 808, one or more network processor unit(s) 810 interconnected with one or more network input/output (I/O) interface(s) 812, one or more I/O 814, and control logic 820. In various embodiments, instructions associated with logic for computing device 800 can overlap in any manner and are not limited to the specific allocation of instructions and/or operations described herein.

In at least one embodiment, processor(s) 802 is/are at least one hardware processor configured to execute various tasks, operations and/or functions for computing device 800 as described herein according to software and/or instructions configured for computing device 800. Processor(s) 802 (e.g., a hardware processor) can execute any type of instructions associated with data to achieve the operations detailed herein. In one example, processor(s) 802 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 804 and/or storage 806 is/are configured to store data, information, software, and/or instructions associated with computing device 800, and/or logic configured for memory element(s) 804 and/or storage 806. For example, any logic described herein (e.g., control logic 820) can, in various embodiments, be stored for computing device 800 using any combination of memory element(s) 804 and/or storage 806. Note that in some embodiments, storage 806 can be consolidated with memory element(s) 804 (or vice versa), or can overlap/exist in any other suitable manner.

In at least one embodiment, bus 808 can be configured as an interface that enables one or more elements of computing device 800 to communicate in order to exchange information and/or data. Bus 808 can be implemented with any architecture designed for passing control, data and/or information between processors, memory elements/storage, peripheral devices, and/or any other hardware and/or software components that may be configured for computing device 800. In at least one embodiment, bus 808 may be implemented as a fast kernel-hosted interconnect, potentially using shared memory between processes (e.g., logic), which can enable efficient communication paths between the processes.

In various embodiments, network processor unit(s) 810 may enable communication between computing device 800 and other systems, entities, etc., via network I/O interface(s) 812 (wired and/or wireless) to facilitate operations discussed for various embodiments described herein. In various embodiments, network processor unit(s) 810 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 800 and other systems, entities, etc. to facilitate operations for various embodiments described herein. In various embodiments, network I/O interface(s) 812 can be configured as one or more Ethernet port(s), Fibre Channel ports, any other I/O port(s), and/or antenna(s)/antenna array(s) now known or hereafter developed. Thus, the network processor unit(s) 810 and/or network I/O interface(s) 812 may include suitable interfaces for receiving, transmitting, and/or otherwise communicating data and/or information in a network environment.

I/O 814 allow for input and output of data and/or information with other entities that may be connected to computing device 800. For example, I/O 814 may provide a connection to external devices such as a keyboard, keypad, mouse, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 820 can include instructions that, when executed, cause processor(s) 802 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 820) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 804 and/or storage 806 can store data, software, code, instructions (e.g., processor instructions), logic, parameters, combinations thereof, and/or the like used for operations described herein. This includes memory element(s) 804 and/or storage 806 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 602.11 (e.g., Wi-Fi®/Wi-Fi6®), IEEE 602.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In some aspects, the techniques described herein relate to a computer-implemented method including: determining a distance between a first wireless client device and a second wireless client device with reference to a wireless access point based on wireless signals transmitted by the first wireless client device and the second wireless client device; determining a first signal loss with reference to the first wireless client device and the wireless access point and a second signal loss with reference to the second wireless client device and the wireless access point; deriving one or more material properties for one or more physical structures between the first wireless client device and the second wireless client device based on the first signal loss and the second signal loss; determining a sound attenuation between the first wireless client device and the second wireless client device based on the one or more material properties; and determining whether a first user of the first wireless client device can hear audio of a second user of the second wireless client device based on the sound attenuation determined between the first wireless client device and the second wireless client device.

In some aspects, the techniques described herein relate to a computer-implemented method, wherein deriving the one or more material properties is based on a predictive model that estimates one or more material types and corresponding thicknesses of the one or more physical structures that are consistent with the first signal loss and the second signal loss.

In some aspects, the techniques described herein relate to a computer-implemented method, wherein the first signal loss and the second signal loss each include a 2.4 GHz signal component and a 5 GHz signal component.

In some aspects, the techniques described herein relate to a computer-implemented method, further including transmitting one or more eavesdropping remediation instructions when it is determined that the first user can hear audio of the second user.

In some aspects, the techniques described herein relate to a computer-implemented method, wherein the one or more eavesdropping remediation instructions cause a visual alert to be activated in line of sight of the second wireless client device of the second user.

In some aspects, the techniques described herein relate to a computer-implemented method, wherein the one or more eavesdropping remediation instructions cause an acoustic countermeasure to be activated at a location in proximity to the first wireless client device or to the second wireless client device.

In some aspects, the techniques described herein relate to a computer-implemented method, wherein determining whether the first user can hear audio of the second user includes determining that the first user can hear the audio of the second user based on a predetermined volume of a voice audio.

In some aspects, the techniques described herein relate to a computer-implemented method, wherein determining whether the first user can hear audio of the second user includes determining that the first user hears the audio of the second user based on a volume of speech audio that is determined by analyzing a voice sample provided by the second user.

In some aspects, the techniques described herein relate to a system including: one or more computer processors; one or more computer readable storage media; and program instructions stored on the one or more computer readable storage media for execution by at least one of the one or more computer processors, the program instructions including instructions to: determine a distance between a first wireless client device and a second wireless client device with reference to a wireless access point based on wireless signals transmitted by the first wireless client device and the second wireless client device; determine a first signal loss with reference to the first wireless client device and the wireless access point and a second signal loss with reference to the second wireless client device and the wireless access point; derive one or more material properties for one or more physical structures between the first wireless client device and the second wireless client device based on the first signal loss and the second signal loss; determine a sound attenuation between the first wireless client device and the second wireless client device based on the one or more material properties; and determine whether a first user of the first wireless client device can hear audio of a second user of the second wireless client device based on the sound attenuation determined between the first wireless client device and the second wireless client device.

In some aspects, the techniques described herein relate to a system, wherein deriving the one or more material properties is based on a predictive model that estimates one or more material types and corresponding thicknesses of the one or more physical structures that are consistent with the first signal loss and the second signal loss.

In some aspects, the techniques described herein relate to a system, wherein the first signal loss and the second signal loss each include a 2.4 GHz signal component and a 5 GHz signal component.

In some aspects, the techniques described herein relate to a system, wherein the program instructions further include instructions to transmit one or more eavesdropping remediation instructions when it is determined that the first user can hear audio of the second user.

In some aspects, the techniques described herein relate to a system, wherein the one or more eavesdropping remediation instructions cause a visual alert to be activated in line of sight of the second wireless client device of the second user.

In some aspects, the techniques described herein relate to a system, wherein the one or more eavesdropping remediation instructions cause an acoustic countermeasure to be activated at a location in proximity to the first wireless client device or to the second wireless client device.

In some aspects, the techniques described herein relate to a system, wherein the instructions to determine whether the first user can hear audio of the second user include instructions to determine that the first user can hear the audio of the second user based on a predetermined volume of a voice audio.

In some aspects, the techniques described herein relate to a system, wherein the instructions to determine whether the first user can hear audio of the second user include instructions to determine that the first user hears the audio of the second user based on a volume of speech audio that is determined by analyzing a voice sample provided by the second user.

In some aspects, the techniques described herein relate to one or more non-transitory computer readable storage media having program instructions embodied therewith, the program instructions executable by a computer to cause the computer to perform operations including: determining a distance between a first wireless client device and a second wireless client device with reference to a wireless access point based on wireless signals transmitted by the first wireless client device and the second wireless client device;

determining a first signal loss with reference to the first wireless client device and the wireless access point and a second signal loss with reference to the second wireless client device and the wireless access point; deriving one or more material properties for one or more physical structures between the first wireless client device and the second wireless client device based on the first signal loss and the second signal loss; determining a sound attenuation between the first wireless client device and the second wireless client device based on the one or more material properties; and determining whether a first user of the first wireless client device can hear audio of a second user of the second wireless client device based on the sound attenuation determined between the first wireless client device and the second wireless client device.

In some aspects, the techniques described herein relate to one or more non-transitory computer readable storage media, wherein deriving the one or more material properties is based on a predictive model that estimates one or more material types and corresponding thicknesses of the one or more physical structures that are consistent with the first signal loss and the second signal loss.

In some aspects, the techniques described herein relate to one or more non-transitory computer readable storage media, further including transmitting one or more eavesdropping remediation instructions when it is determined that the first user can hear audio of the second user.

In some aspects, the techniques described herein relate to one or more non-transitory computer readable storage media, wherein the one or more eavesdropping remediation instructions cause a visual alert to be activated in line of sight of the second wireless client device of the second user.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:
    determining, by a computer, a distance between a first wireless client device and a second wireless client device with reference to a wireless access point based on wireless signals transmitted by the first wireless client device and the second wireless client device;
    determining, by the computer, a first signal loss with reference to the first wireless client device and the wireless access point and a second signal loss with reference to the second wireless client device and the wireless access point;
    deriving, by the computer, one or more material properties for one or more physical structures between the first wireless client device and the second wireless client device based on the first signal loss and the second signal loss;
    determining, by the computer, a sound attenuation between the first wireless client device and the second wireless client device based on the one or more material properties; and
    determining, by the computer, whether a first user of the first wireless client device can hear audio of a second user of the second wireless client device based on the sound attenuation determined between the first wireless client device and the second wireless client device.

2. The computer-implemented method of claim 1, wherein deriving, by the computer, the one or more material properties is based on a predictive model that estimates one or more material types and corresponding thicknesses of the one or more physical structures that are consistent with the first signal loss and the second signal loss.

3. The computer-implemented method of claim 1, wherein the first signal loss and the second signal loss each include a 2.4 GHz signal component and a 5 GHz signal component.

4. The computer-implemented method of claim 1, further comprising transmitting, by the computer, one or more eavesdropping remediation instructions when it is determined that the first user can hear audio of the second user.

5. The computer-implemented method of claim 4, wherein the one or more eavesdropping remediation instructions cause a visual alert to be activated in line of sight of the second wireless client device of the second user.

6. The computer-implemented method of claim 4, wherein the one or more eavesdropping remediation instructions cause an acoustic countermeasure to be activated at a location in proximity to the first wireless client device or to the second wireless client device.

7. The computer-implemented method of claim 1, wherein determining, by the computer, whether the first user can hear audio of the second user comprises determining that the first user can hear the audio of the second user based on a predetermined volume of a voice audio.

8. The computer-implemented method of claim 1, wherein determining, by the computer, whether the first user can hear audio of the second user comprises determining that the first user hears the audio of the second user based on a volume of speech audio that is determined by analyzing a voice sample provided by the second user.

9. A system comprising:
    one or more hardware processors;
    one or more non-transitory computer readable storage media; and
    program instructions stored on the one or more non-transitory computer readable storage media, the program instructions, when executed by the one or more hardware processors, cause the one or more hardware processors to:
        determine a distance between a first wireless client device and a second wireless client device with reference to a wireless access point based on wireless signals transmitted by the first wireless client device and the second wireless client device;
        determine a first signal loss with reference to the first wireless client device and the wireless access point and a second signal loss with reference to the second wireless client device and the wireless access point;
        derive one or more material properties for one or more physical structures between the first wireless client device and the second wireless client device based on the first signal loss and the second signal loss;
        determine a sound attenuation between the first wireless client device and the second wireless client device based on the one or more material properties; and
        determine whether a first user of the first wireless client device can hear audio of a second user of the second wireless client device based on the sound attenuation determined between the first wireless client device and the second wireless client device.

10. The system of claim 9, wherein deriving the one or more material properties is based on a predictive model that estimates one or more material types and corresponding thicknesses of the one or more physical structures that are consistent with the first signal loss and the second signal loss.

11. The system of claim 9, wherein the first signal loss and the second signal loss each include a 2.4 GHz signal component and a 5 GHz signal component.

12. The system of claim 9, wherein the program instructions, when executed by the one or more hardware processors, further cause the one or more hardware processors to transmit one or more eavesdropping remediation instructions when it is determined that the first user can hear audio of the second user.

13. The system of claim 12, wherein the one or more eavesdropping remediation instructions cause a visual alert to be activated in line of sight of the second wireless client device of the second user.

14. The system of claim 12, wherein the one or more eavesdropping remediation instructions cause an acoustic countermeasure to be activated at a location in proximity to the first wireless client device or to the second wireless client device.

15. The system of claim 9, wherein the program instructions, when executed by the one or more hardware processors, cause the one or more hardware processors to determine whether the first user can hear audio of the second user by determining that the first user can hear the audio of the second user based on a predetermined volume of a voice audio.

16. The system of claim 9, wherein the program instructions, when executed by the one or more hardware processors, cause the one or more hardware processors to determine whether the first user can hear audio of the second user by determining that the first user hears the audio of the second user based on a volume of speech audio that is determined by analyzing a voice sample provided by the second user.

17. One or more non-transitory computer readable storage media having program instructions embodied therewith, the program instructions, when executed by a computer, cause the computer to perform operations including:
  determining a distance between a first wireless client device and a second wireless client device with reference to a wireless access point based on wireless signals transmitted by the first wireless client device and the second wireless client device;
  determining a first signal loss with reference to the first wireless client device and the wireless access point and a second signal loss with reference to the second wireless client device and the wireless access point;
  deriving one or more material properties for one or more physical structures between the first wireless client device and the second wireless client device based on the first signal loss and the second signal loss;
  determining a sound attenuation between the first wireless client device and the second wireless client device based on the one or more material properties; and
  determining whether a first user of the first wireless client device can hear audio of a second user of the second wireless client device based on the sound attenuation determined between the first wireless client device and the second wireless client device.

18. The one or more non-transitory computer readable storage media of claim 17, wherein deriving the one or more material properties is based on a predictive model that estimates one or more material types and corresponding thicknesses of the one or more physical structures that are consistent with the first signal loss and the second signal loss.

19. The one or more non-transitory computer readable storage media of claim 17, further comprising transmitting one or more eavesdropping remediation instructions when it is determined that the first user can hear audio of the second user.

20. The one or more non-transitory computer readable storage media of claim 19, wherein the one or more eavesdropping remediation instructions cause a visual alert to be activated in line of sight of the second wireless client device of the second user.

* * * * *